Patented Apr. 20, 1937

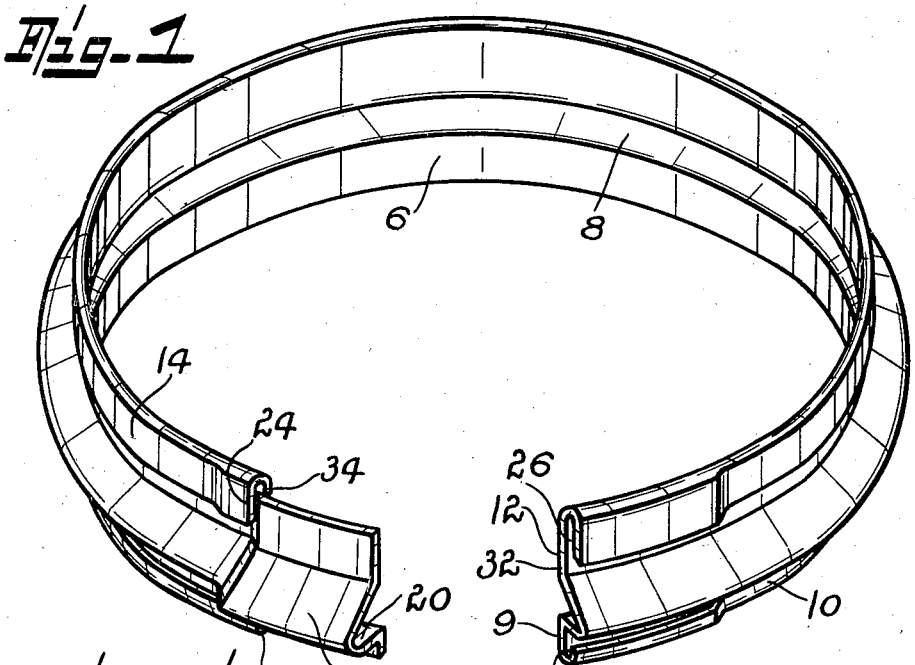
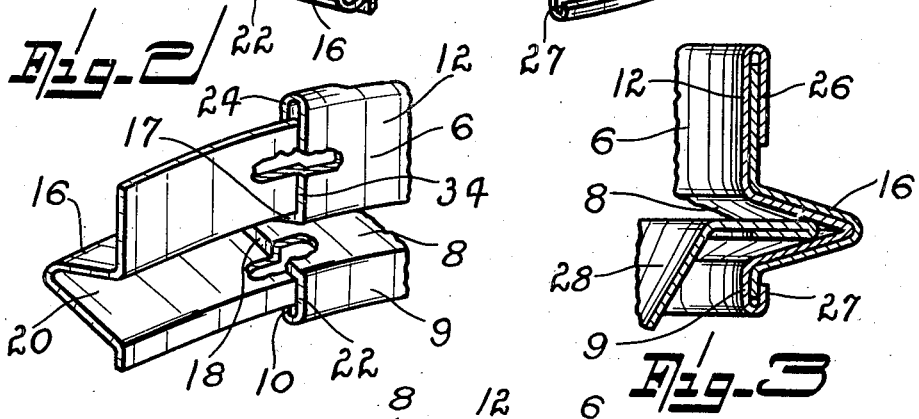
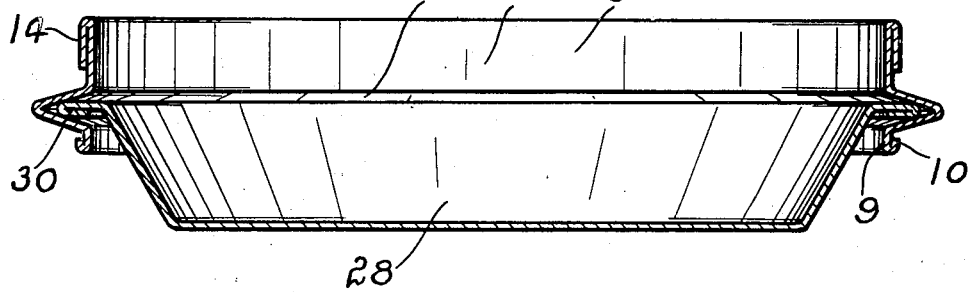

2,077,868

UNITED STATES PATENT OFFICE 2,077,868

PIE JUICE RETAINER

Guy R. Adams, Seattle, Wash.

Application February 11, 1936, Serial No. 63,455

3 Claims. (Cl. 53—6)

My present invention relates to the art of baking devices or utensils and, more particularly, to a device intended for attachment to a pie tin, which may most properly be termed a pie juice retainer.

In the baking of fruit and berry pies it has been very difficult in the past to provide a pie tin which would successfully retain, within the pie, all the juices of the fruit during the process of baking. I am well aware that many attempts have been made to solve this problem in the past. Those observed, however, have been characterized by a construction which limited their attachment to pans made especially for the same or if attempt was made to attach them to the usual pie tins a tight and secure joint could not be obtained that would effectively prevent the leakage of the juices as they were boiled during the baking process. With my present construction I believe I have provided a device that overcomes the deficiency of those now available.

The principal object of my present invention is to provide a pie juice retainer which can easily and securely be attached to the ordinary pie tin and thus prevent the juices from dripping over and being deposited in the oven with the attendant smoke and residue.

Other and more specific objects will be apparent from the following description taken in connection with the accompanying drawing, wherein Figure 1 illustrates in perspective view a juice retaining rim for attachment to a pie tin.

Figure 2 illustrates in perspective view, partly in section, the tongue portion of my juice retaining rim which serves to join together the two ends of the rim, the view being reversed from the showing in Figure 1.

Figure 3 is a cross-sectional view taken through the joint of my juice retaining ring when the same is locked in position on the bead of a pie tin.

Figure 4 is a cross-sectional view in elevation through a pie tin with my juice retaining rim in position.

Referring to the drawing, throughout which like reference characters indicate like parts, 6 designates generally my pie juice retaining rim. This is provided with an annularly disposed V-shaped groove 8. This groove is of a sufficient breadth and depth that it will satisfactorily engage the varying shaped rims encountered on the average pie tins. At the lower extremity of the V-shaped groove, I provide a downwardly extending flange 9 which, to the end of making the device stiff and less subject to damage even though made of thin metal, I provide with a turned up bead as 10. Above the V-shaped groove is an upwardly extending flange 12. This flange should extend upwardly far enough to take care of all the overflow juices that may be exuded by a pie while it is being baked and the fruit is boiling. As in the case of the lower flange 9 I prefer that the metal be turned back on itself to form a substantial bead 14.

Now, it is very desirable that the retaining rim provide a true circle so that engagement with the pie tin may be continuous throughout its length. To this end I have provided an interlocking arrangement shown in Figures 1, 2 and 3, wherein a tongue portion 16 is formed having an extension of the metal forming the annular groove 8 but having the metal formed in the nature of a step as is best illustrated in Figure 2 as at 17 and 18. This step or increase in the size of the groove should be an amount to equal the thickness of the metal used so that the enlarged, grooved portion 20 will lie snugly and engage firmly the outer surface of groove 8 when the device is in proper position. In order that there will be no excessive distortion of this tongue, I provide that the turned beads 10 and 14 stop at point 22 and 24, respectively.

The opposite end of rim 6 must be slightly deformed in order to engage and lock onto tongue 16. This is provided by having the down turned member 14 spaced somewhat away from body 12 as indicated at 26, and to similarly have the lower bead 10 face away from the flange portion 9 as at 27.

*Method of operation*

In using my device the pie can be placed in the pie tins 28 in the usual manner and the crust can be trimmed off around the margin as is normal. Rim 6 is then strung around the pie tin so that the bead 30 of the pie tin engages groove 8. The two ends of the retainer are then brought together so that tongue 16 engages within the spaces provided at 26 and 27 and the ends are forced together until the end surface 32 of rim 12 abuts against the jog formed at the other end of the rim as 34, 17 and 18. This then insures that a full circle is completed which will securely engage the pie tin bead throughout its entire circumference and provide a secure engagement therewith. By virtue of the fact that the V-shaped groove 8 will come to rest on the upper and lower surface of bead 30 in a tapered or wedge-like engagement it will insure a full, continuous contact. This will provide against any leakage occurring. Rim 6 should be made with an inherent, outward displacement of tongue 16 so that, as the rather rigid structure tends to force tongue 16 outwardly against the down-turned lips at 26 and 27, the frictional engagement will be sufficient to hold the rim securely in place.

The foregoing description and the accompanying drawing are believed to clearly disclose a preferred embodiment of my invention but it will be understood that this disclosure is merely illustrative and that such changes in the invention may be made as are fairly within the scope and spirit of the following claims:

1. A juice retainer, for pie pans, comprising a split annular band having a V-shaped groove and an upper juice-retaining flange, the ends of said band adapted to lap, one of said ends terminating in the groove and retaining flange formation and also having a lower bead, and the other end of the band having a downturned flange forming a groove to receive the end of the retaining flange and an upturned flange to form a lower groove for the reception of the bead.

2. A juice retainer, for pie pans, comprising a split annular band having an intermediate V-shaped groove, an upper retaining flange, and a lower bead, the ends of the band adapted to lock in frictional engagement when lapped, one of said ends forming a slide-tongue, the other end having a down-turned flange on its retaining flange forming a groove to receive the retaining-flange portion of the first end and an upturned flange at its bead-edge forming a groove to receive the bead-portion of the tongue.

3. A juice retainer, for pie pans, comprising a split annular band having an intermediate V-shaped groove, an upper flange bent downwardly upon itself to form a two-ply retaining flange, and a lower flange bent upwardly on itself to form a lower edge-bead, the ends of the band adapted to lap in frictional engagement to lock the band, one end of the band terminating in a friction tongue, the other end of the band having its bent retaining-flange opened to form a groove and the lower edge-bead opened to form a groove, whereby the tongue end of the band may be slipped into frictional locking engagement with the grooved end of the band.

GUY R. ADAMS.